United States Patent [19]

Benayoun et al.

[11] Patent Number: 5,799,158

[45] Date of Patent: Aug. 25, 1998

[54] ADAPTER FOR TRANSFERRING BLOCKS OF DATA HAVING A VARIABLE SIZE TO OTHER ADAPTERS VIA A MAIN SYSTEM BUS

[75] Inventors: Alain Benayoun, Cagnes Sur Mer; Jean-Francois Le Pennec, Nice; Patrick Michel, La Gaude; Patrick Sicsic, La Colle Sur Loup, all of France

[73] Assignee: International Business Machines Corporation, Armonk, N.Y.

[21] Appl. No.: 687,071

[22] Filed: Jul. 15, 1996

Related U.S. Application Data

[63] Continuation of Ser. No. 251,540, May 31, 1994, abandoned.

[51] Int. Cl.⁶ .............................. G06F 13/00; G06F 13/38
[52] U.S. Cl. ........................... 395/285; 395/287; 395/849; 395/855
[58] Field of Search .......................... 395/280, 285–286, 395/287, 849, 855

[56] References Cited

U.S. PATENT DOCUMENTS

| | | | |
|---|---|---|---|
| 5,101,478 | 3/1992 | Fu et al. ........................... | 395/275 |
| 5,193,149 | 3/1993 | Awiszio et al. ................... | 395/200 |
| 5,392,446 | 2/1995 | Tower et al. ..................... | 395/800 |

*Primary Examiner*—Jack B. Harvey
*Assistant Examiner*—Jeffrey K. Seto
*Attorney, Agent, or Firm*—Joscelyn G. Cockburn; Felsman, Bradley, Gunter & Dillon

[57] ABSTRACT

An adapter for transferring blocks of data of a variable size to at least one destination adapter, each of the adapters being plugged in a respective slot and connected to a main system bus which is controlled by a central backplane card. In each adapter, the transmission of one block of data is provided, in part, by a device, operative in response to the detection of an ACK acknowledge word giving access to the bus, for generating a signalling word to be transmitted to a particular destination adapter which will actually receive the transmitted data; the signalling word comprising information characterizing the type of command which the transmitting adapter sends as a request to the backplane card, the address of the particular adapter which will receive the transmitted data, the size of the block of the transmitted data and the address of the transmitting adapter. The adapter is best suited for use in multimedia systems where variable size data blocks are required to transmit data, voice, video, etc.

12 Claims, 14 Drawing Sheets

ADAPTER FOR TRANSFERRING BLOCKS OF DATA HAVING A VARIABLE SIZE TO OTHER ADAPTERS VIA A MAIN SYSTEM BUS

This is a continuation of application Ser. No. 08/251,540 filed on May 31, 1994 now abandoned.

TECHNICAL FIELD

The invention relates to telecommunication equipments and more particular to an adapter for transferring blocks of data of variable size to other adapters which are all connected to a main system bus.

BACKGROUND ART

With the advent of the digital high-speed communication networks, the transport and processing of multimedia information, including data, images and sound, has been made possible.

However, when considering the internal structure of the telecommunication equipments which are intended to handle such composite information, it appears particularly difficult to adapt the structure of the telecommunication equipment, basically formed of different adapters communicating together via a main system bus; so that it becomes possible, and easy, to handle blocks of data of different sizes fitting with the nature of the information (image, sound, ...) to be transmitted.

SUMMARY OF THE INVENTION

The problem to be solved by the present invention is to provide a high speed multimedia bus to which are connected multiple communicating adapters, and which allows one adapter to exchange data with another adapter card having a variable size.

This problem is solved by the adapter according to the present invention for transferring blocks of data having a variable size to at least one destination adapter, each of the adapters being plugged in a respective slot and connected together via a main system bus under control of a central backplane card providing the arbitration process. In accordance with the present invention, each adapter comprises: provided by means of:

means for reading the slot identification characterizing the physical location where said transmitting adapter was plugged, means for generating a REQUEST word to be transmitted to said central backplane card via the system bus in order to request the access to the system bus, said REQUEST word being characteristic of the slot identification which was previously read;

means for detecting an ACK acknowledge word generated by said central backplane having processed all the REQUEST words which were generated by the different adapters connected to the bus, said ACK word characterizing a particular adapter which is granted the access to said system bus;

means operative in response to the detection of said ACK acknowledge word giving the access to the bus, for generating a signalling word to be transmitted to a particular destination adapter which will actually receive said transmitted data, said signalling word comprising information characterizing the type of command which said transmitting adapter requests to said backplane card, the address of said particular adapter which will receive said transmitted data, the size of the block of said transmitted data, and the address of said transmitting adapter;

means for successively transmitting the blocks of data after said SIGNALLING word, the signalling word being received and processed by said destination adapter which is to receive the data block having said particular size.

Preferably, the REQUEST word is formed of consequentive ONE with one unique ZERO, the location of which in the word characterized the slot identification of the adapter.

In a preferred embodiment of the invention, each adapter comprises a processor associated with RAM and ROM storage (250, 300) for computing said REQUEST word from the reading of the slot identification of said adapter;

a first register for storing said REQUEST word being computed by said processor (100) after the reading of said slot identification;

means for detecting a SYNC control signal generating by said central backplane card, said SYNC control signal being representative of the availability of the system bus;

means responsive to said SYNC control signal for causing said REQUEST word stored into said register (440) to generate said REQUEST to said system bus.

The reception of one data block in the destination adapter is achieved by means of:

means for monitoring the SIGNALLING word which is transmitted via said system bus;

means for processing said SIGNALLING word further comprising means for decoding the address of the destination adapter in order to determine whether the block of data which will be transmitted through the bus is to be received by said adapter; and means for extracting the size of the block in said SIGNALLING word in order to determine the size of the storage location which will be used for storing said data block.

DESCRIPTION OF THE PREFERRED EMBODIMENT OF THE INVENTION

Figure 1A:
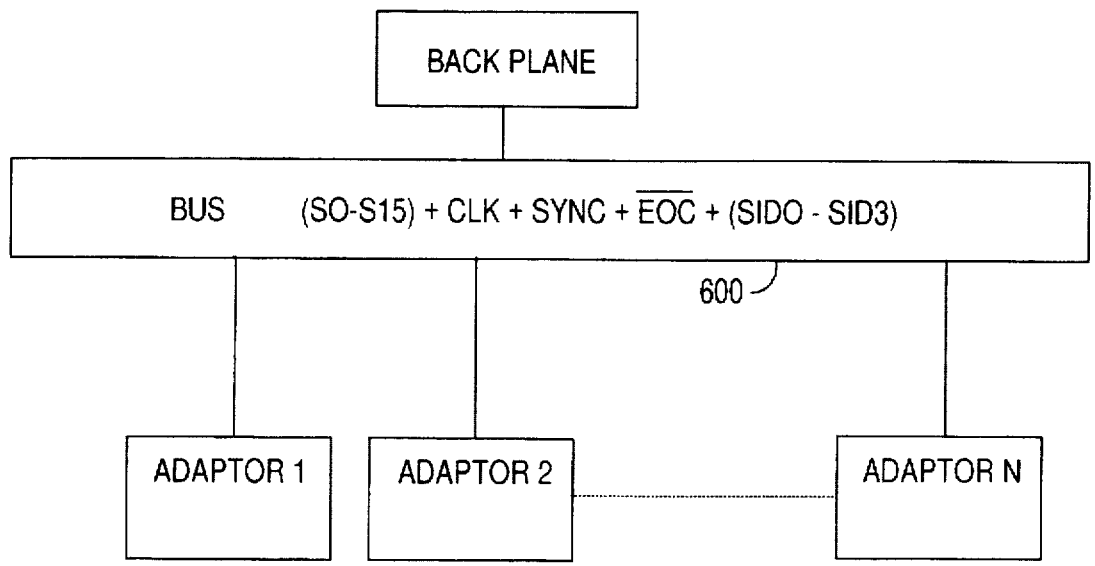
FIG. 1A is an overall view of the multi-media bus 600 allowing communication between a back plane card and the different adapters.
Figure 1B:
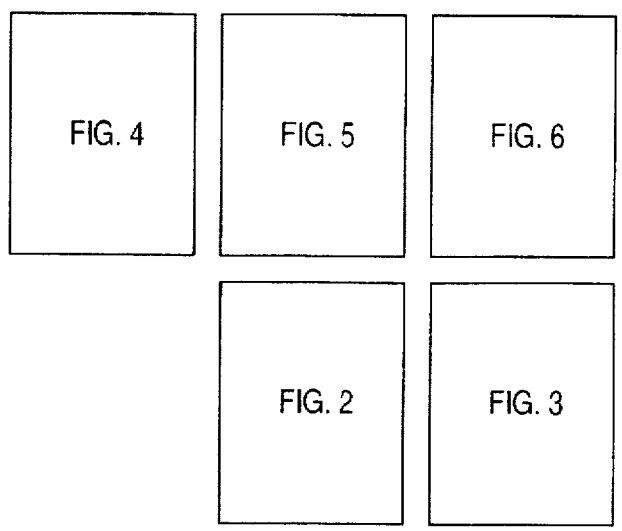
FIG. 1B is a self-explanatory chart showing the arrangement of FIGS. 2–6 in order to provide a full comprehensive diagram of the structure of each adapter connected to the multi-media bus.
Figure 2:
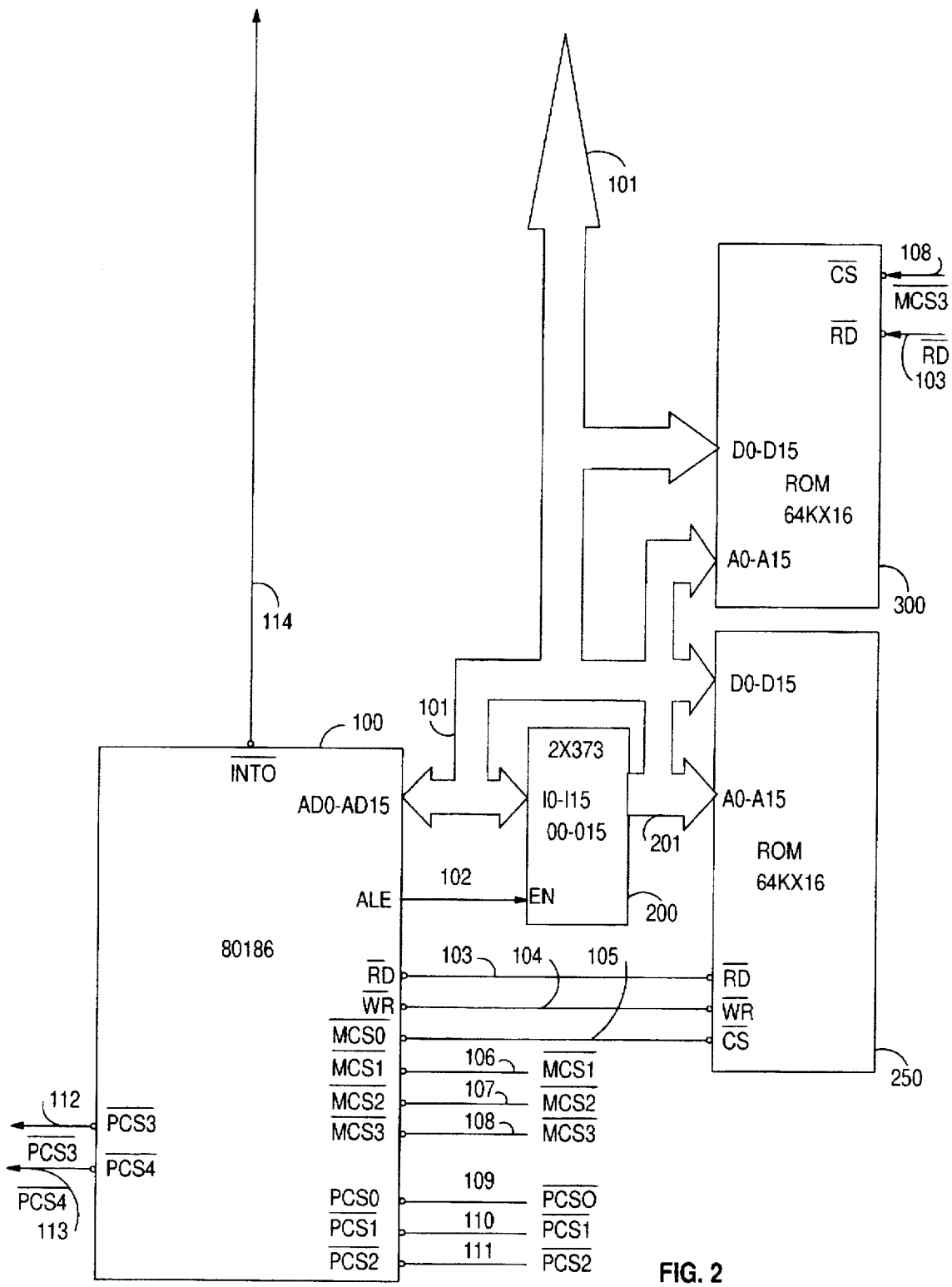
FIGS. 2 to 6 are detailed illustrations of the structure of each adapter.
Figure 3:
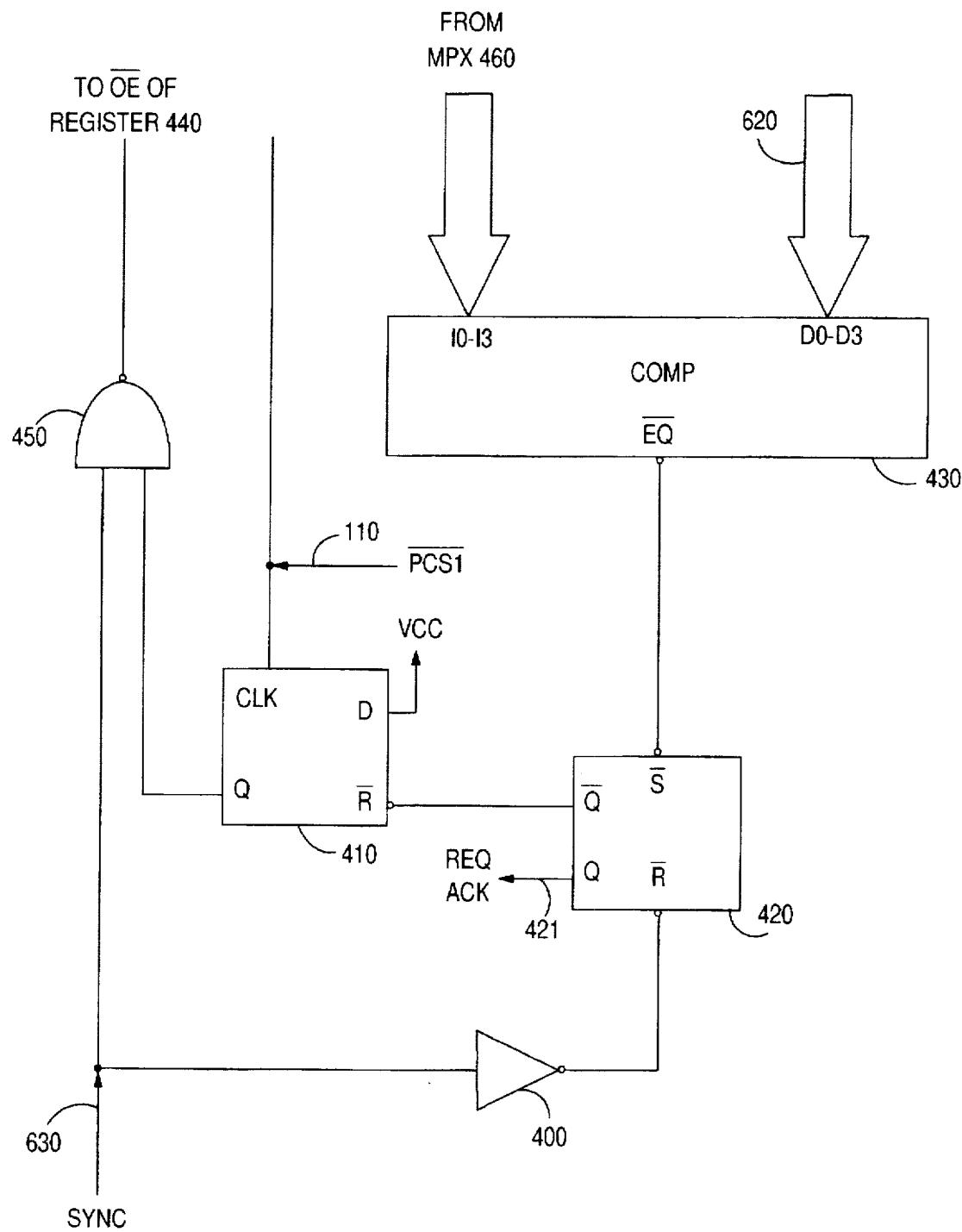

The structure of each adapter is illustrated in the set of FIGS. 2–6 which must be arranged in accordance with the diagram of FIG. 1B.

The system bus comprises a set of sixteen data signals S0–S15. It should be noticed that a different number of data signals could be used in another embodiment of the invention, e.g. a set of 32 data signals providing a 32-bit data bus. In addition to the 16 data bits carried on data bus 610, there is a CLK clock signal lead 640, a SYNC synchronization lead 630, an EOC END_OF_CYCLE lead 650, and a set of four SID Slots_Identification control leads 620, the particular function of all these different signals being fully described with details hereinafter.

Each adapter has, from the backplane a different and unique SID0–SID3 value in order to distinguish it from the other adapters.

Prior to a comprehensive description of the working of the adapters with the backplane, there will now be given a basic description of the structure of each adapter.

Figure 5:
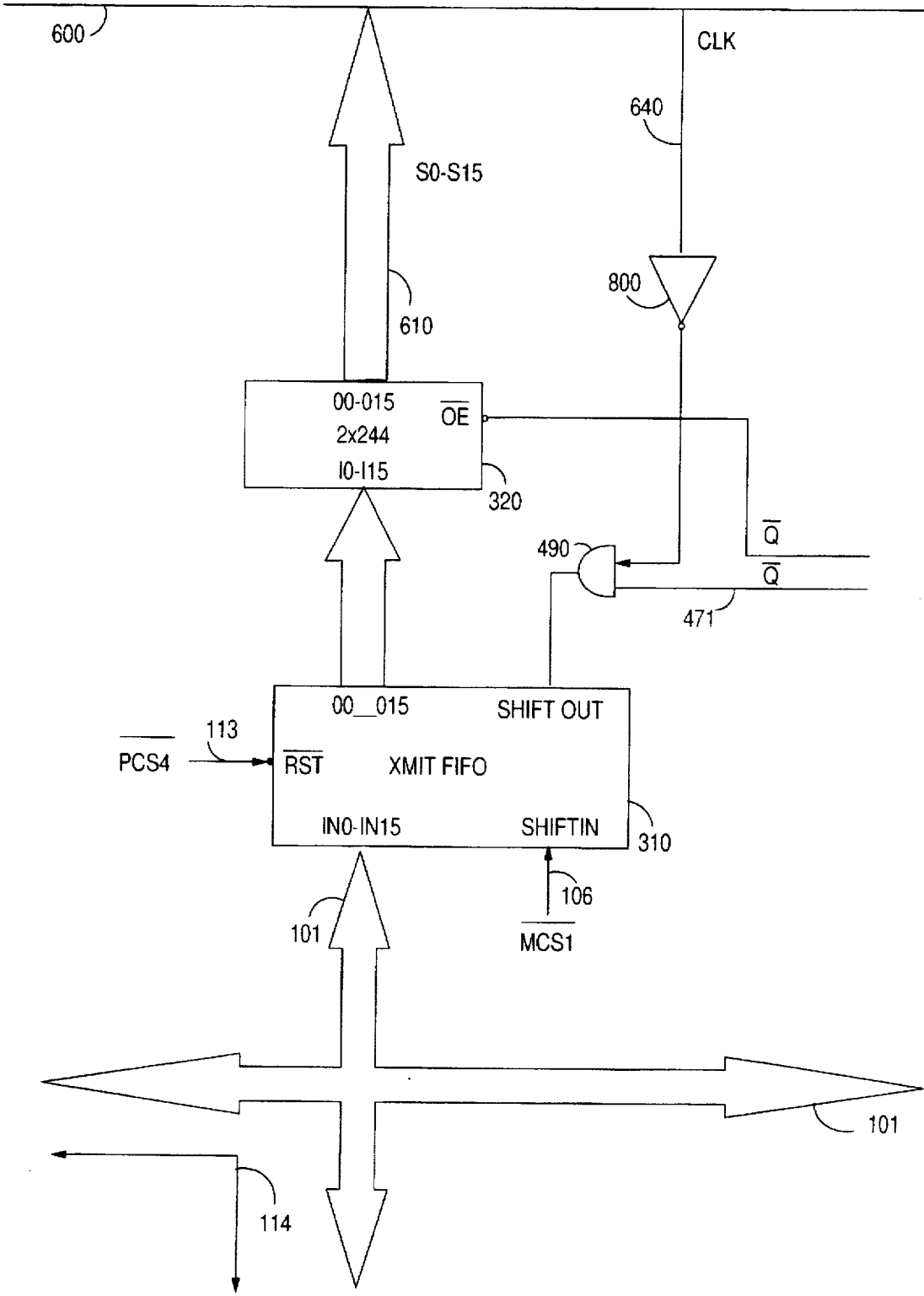

As illustrated in FIG. 5, each adapter comprises a XMIT FIFO transmit First-IN-First-Out parallel buffer 310 for storing the data which will be extracted from a RAM storage 250 (shown in FIG. 2) under control of a microprocessor 100 by means of a 16 bits address-data bus 101. The output of XMIT FIFO buffer 310 is connected to the system bus 600 by means of a buffer 320, of the type 74F244.

Figure 4:
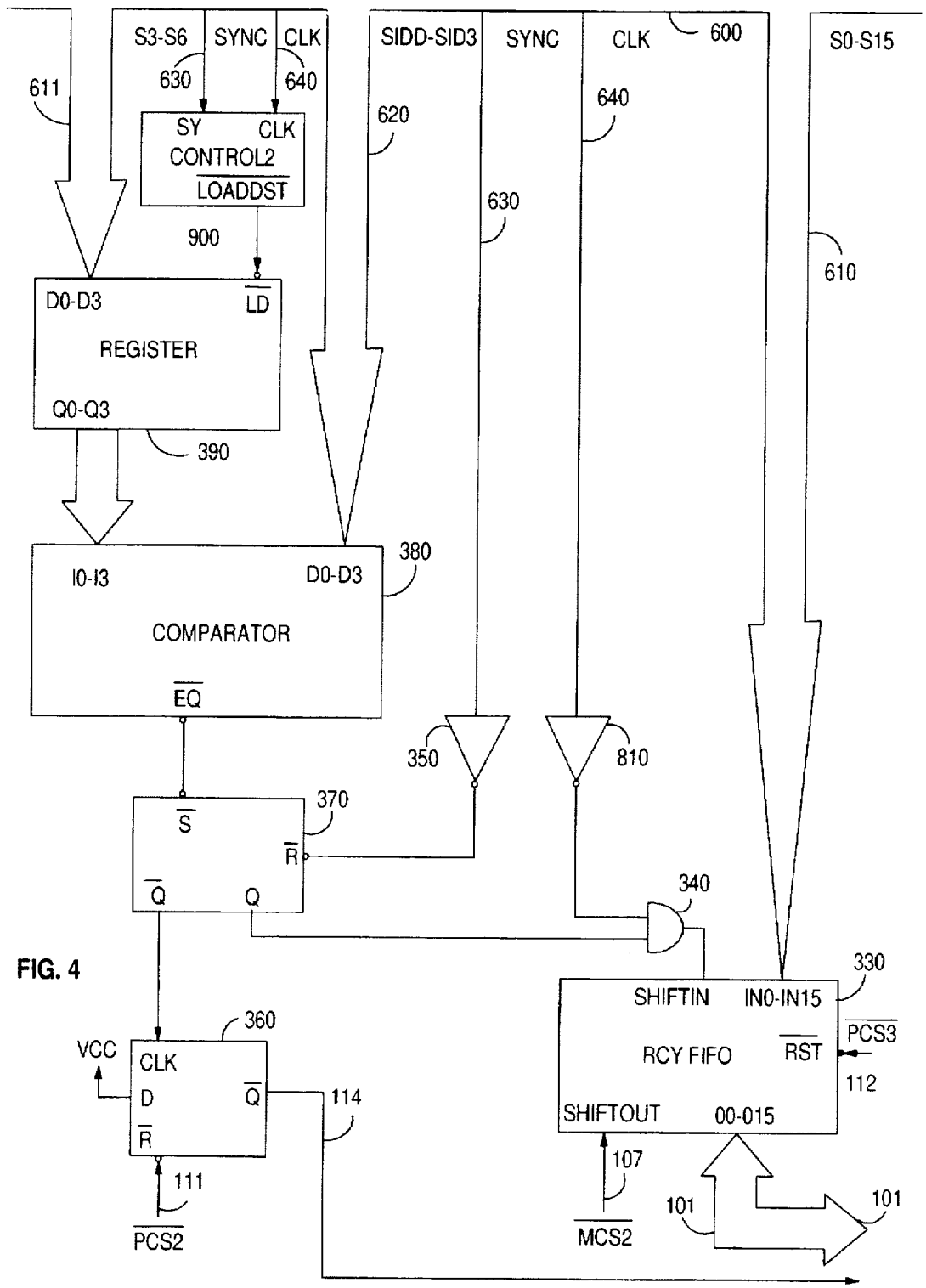

Similarly, as shown in FIG. 4, the receive part of the adapter comprises a RCV_FIFO Receive first in first out parallel buffer 330 for storing the data which are received from the data bus 610 extracted from the system bus. The output of RCV FIFO 330 is connected to the data bus 101 of microprocessor 100.

Additionally, each adapter comprises a set of circuits which are used for reading the SID identifications signals carried on system bus 600 on a bus 620. A buffer 480, of the type 74F244 as above has its input bus connected to bus 620 and an output bus which is connected to the data bus 101 of microprocessor 100.

A ROM storage 300 is connected to the data bus 101 of microprocessor 100. Both ROM 300 and RAM storage 250 have an address bus A0–A15 201 which are connected to the output of a demultiplexor 200, of the type 74S373 well known to the skilled man, which ENABLE input lead is connected to the ALE lead 102 of micro-processor 100. Demultiplexor 200 has its input bus connected to the address/data bus 101 of microprocessor 100. At last, ROM storage 300 is provided with the necessary control signals, including RD READ signal 103, a chip select control signal coming from the MCS3 output lead of microprocessor 100. Similarly, RAM storage is provided with RD control signal 103, WR control signal 104, a chip select control signal coming from the MCS0 lead 105 of microprocessor 100.

The control of all the operations which will be fully described hereinafter is provided by an additional circuitry comprising a set of comparators 380 (in FIG. 4), 430 (in FIG. 3) and comparator 500 (in FIG. 6), associated with registers 390, 530, 440. With respect to FIG. 6, there is associated a counter 520, a register 530, which both will be used for determining the length of the transmit data block. A first control state machine 540 provides the necessary control signals for the transmit operations, while a second control state machine 900, in FIG. 4, provides those of the receive operations.

The back plane card on which the different adapter cards can be plugged is fitted with some slot connectors with an additional circuitry which will now be described. The back plane card comprises an arbiter circuit 700 made up of combinatory circuits as described in FIG. 13, which receive the sixteen signals S0–S15 on a bus 610, extracted from the system bus 600 through a 16-bit latch 710. The output bus 701 of Arbiter circuit 700 is also connected to bus 610 via a 16-bit buffer 720. The control signals which are necessary for the transmit and receive operations are provided by a CONTROL_3 state machine 730. A clock circuit 740 provides a clock signal 640 which is distributed to the whole system via the system bus 600.

It will now be described the working of the apparatus, and particularly exchange of the data between two different adapters through bus 600.

Assuming that one given adapter A wishes to transfer a data block which is loaded inside its memory storage 250, into that of a second adapter B. For that purpose, processor 100 of adapter A firstly initiates the reading of the SID slot identification which has been assigned to adapter A and which characterize the physical location of the slot where the adapter is plugged. Assuming that adapter card has been plugged in the first position on the back plane, the SID slot identification will be equal to "0000" (in Hexadecimal). Assuming it were located on the second position on the back plane, the SID slot identification would be equal to "0001" etc . . .

The reading of the buffer 480 is achieved by the generation of a Out-Enable control signal which is generated at the PCS0 lead 109 of processor 100, and the slot identification is then made available on address/data bus 101.

From this moment, processor resets both XMIT and RCV FIFO circuits 310 and 330 by means of two control signals respectively generated at the PCS4 output lead 113 and a PSC3 output lead 112.

Then, processor 100 of adapter A transfers the data block which is stored within RAM storage 250 to XMIT FIFO 310. This is achieved by the sequential READ of the data located into the RAM, and their WRITE from the address/data bus 101 to the input of the XMIT FIFO 310. The shifting is achieved by means of a control signal coming from the MCS1 output lead 106 of processor 100.

The first word of this data block is defined as a 16-bit SIGNALLING word, while the remainder of the data block will be referred to as a DATA block. This SIGNALLING word is computed as follows:

D0–D2 defines the type of command which the adapter requests to back plane,

D3–D6 defines the address SID0–3 of the destination adapter, that is adapter B in our example.

D7–D11 defines the data block size to be transmitted, in terms of a number of words which will be exchanged.

D12–D15 defines the address SID0–3 of the source adapter, that is adapter A in our example.

Figure 6:
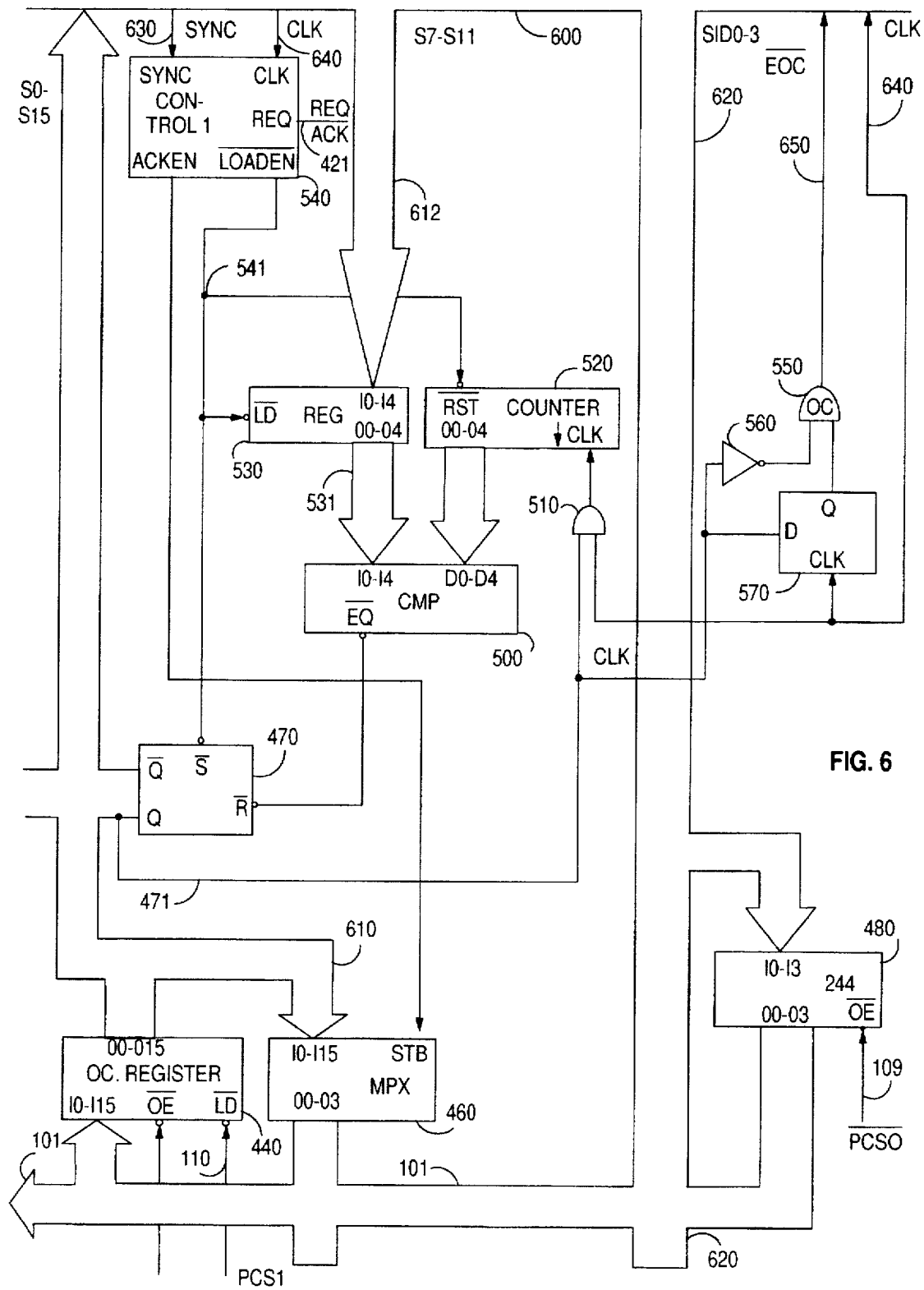
Figure 7:
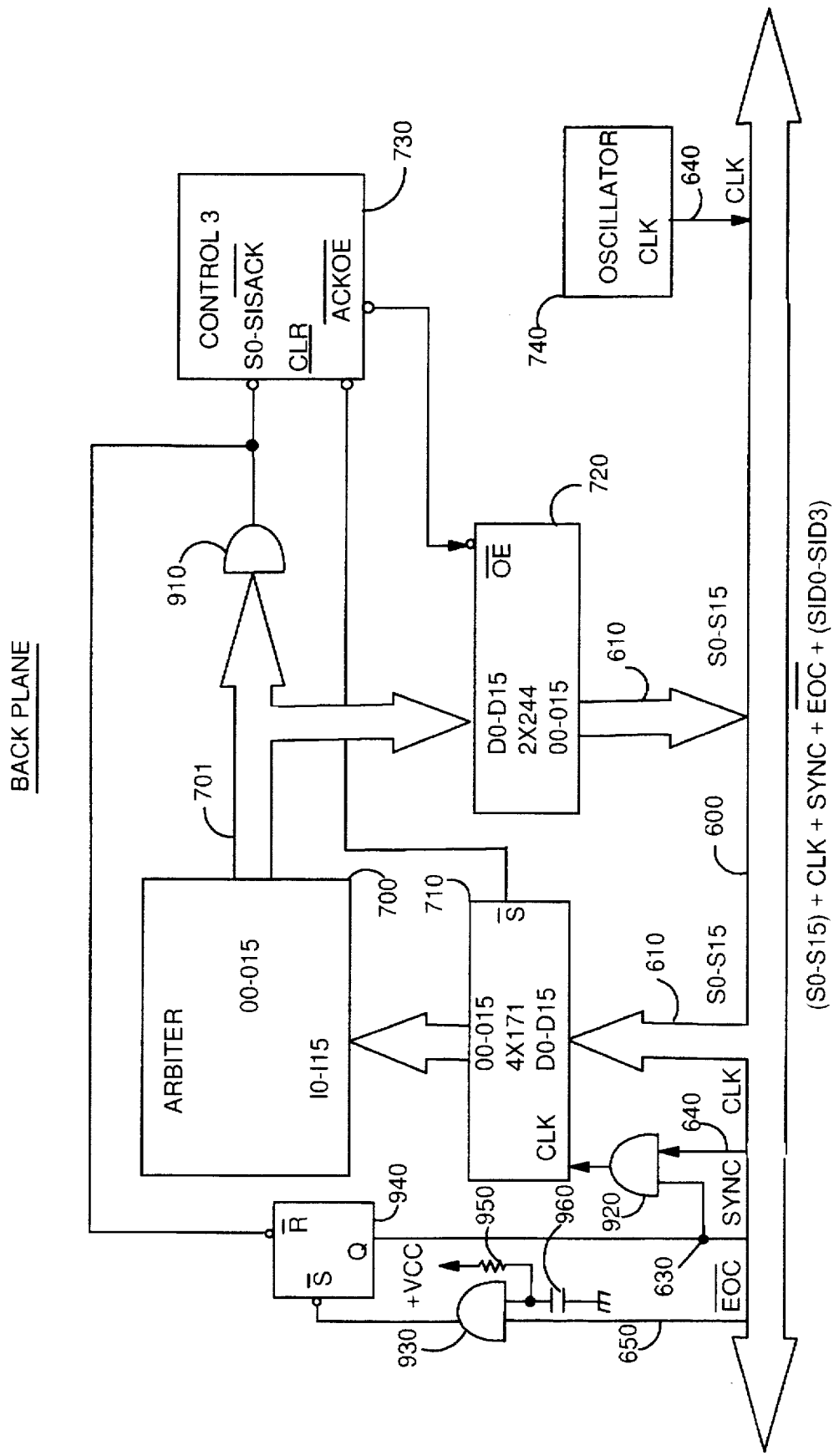
FIG. 7 shows the structure of the backplane card.

In order to request the bus, processor 100 writes into register 440 of FIG. 6 a 16-bit REQUEST word by means of a control signal generated at the PCS1 output lead 110 and transmitted to the LOAD input lead of an open collector register 440. The latter PCS1 control signal is also transmitted to a clock input of a Latch 410, what results in the latter being loaded with a logical "1" since its D input lead receives the positive voltage value.

The value of the 16-bit REQUEST word which is stored into register 440 by processor 100 is fixed in accordance to the SID slot identification which was previously read by the processor 100. In the example above, since the adapter A is assumed to have been plugged in the first slot, the processor 100 will store the "FFFE" (in hexadecimal) or "1111111111111110" (in binary). In the preferred embodiment of the invention, a logical "0" corresponds to the position of the slot where the considered adapter has been plugged. Similarly, if the adapter had been plugged in the second slot position, the 16-bit word would have been "1FFFD" (in hexadecimal) or "1111111111111101" (in binary).

The SYNC synchronization control signal, generated by the control circuit on back plane card, is fixed to a logical "1" when the system bus is available for the adapters. Therefore, when the latter SYNC signal, being transmitted to first input lead of a NAND gate 450 (in FIG. 3), having its second input lead receiving the Q output lead of latch 410, generates a low level at its output. This low level is transmitted to the Output_Enable OE input lead of register 440, what results in REQUEST word being available at the output bus 610 connected to the S0_S15 leads of the system bus 600.

Figure 9:
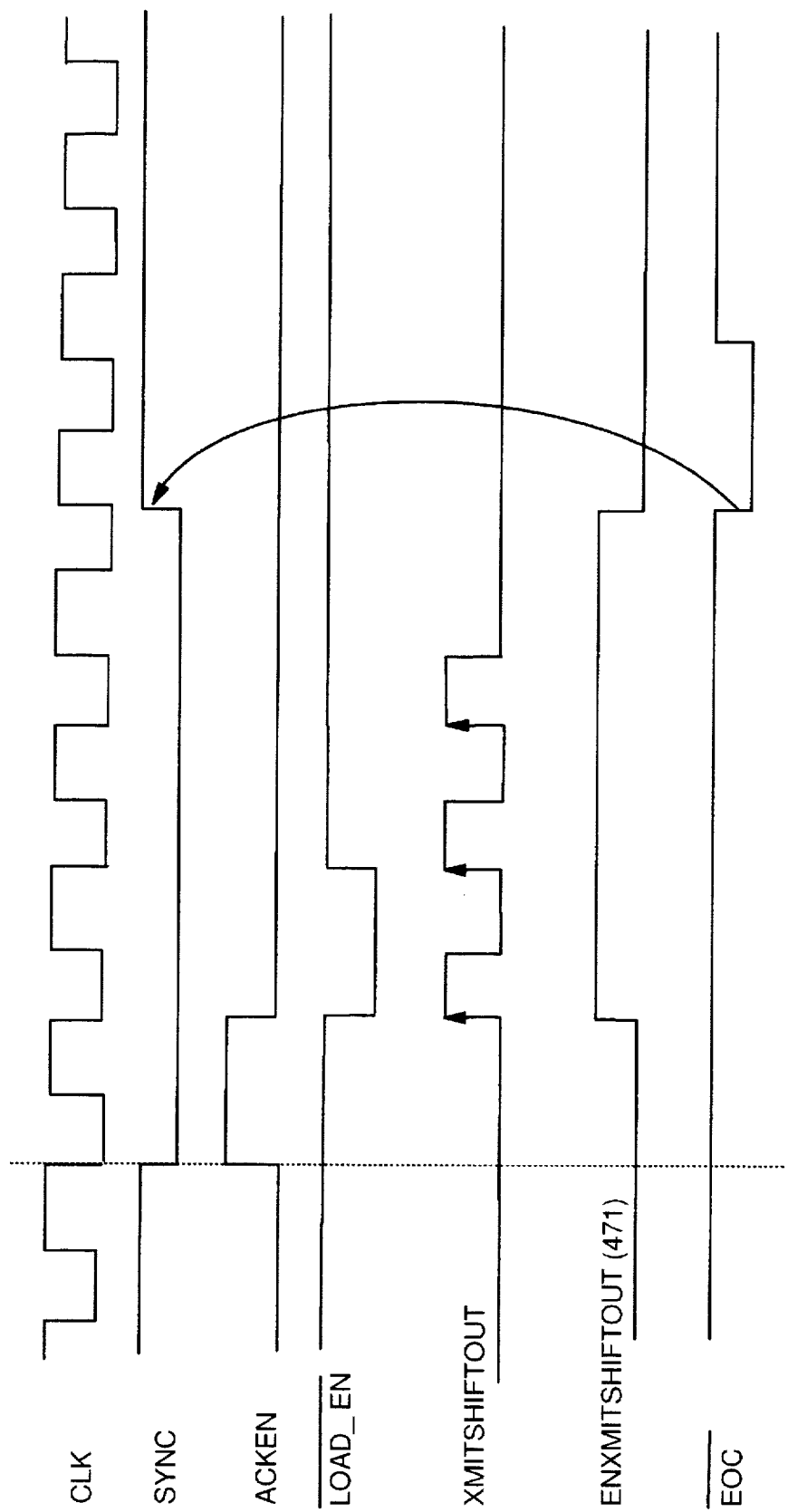
FIG. 9 shows representative signals used during the transmission of the data block by XMIT_FIFO circuit 310.

Since one among the S0–S15 leads carried on the system bus 600 is at least set to a logical zero, the arbiter 700 on the back plane card is made aware that at least one adapter card is requesting the bus. The SYNC signal which is extracted from the system bus is transmitted to a first input lead of an AND gate 920 having a second input receiving the system clock 640, as shown in FIG. 9. Since that SYNC lead is at a logical "1", the CLOCK signal is consequently transmitted to the CLOCK input of a 16-bit latch 710, what results in the REQUEST word been made available to the arbiter 700 via bus I0–I15.

It should be noticed that, in order to permit a right working of the system, the SYNC must be put at a logical one after the power-on of the system. This is achieved by means of an additional circuitry consisting of a LATCH circuit 940, an AND gate 930, and associated with a resistor 950 and a capacitor 960, both constituting a RC circuit. On the power-on of the system, capacitor 960 maintains a low level at the first input of AND 930 during a period of about RC. Therefore, the output of AND 930 is also maintained at a zero logical state, what results in the setting of latch 940. Therefore, the Q output of the latter, and consequently the SYNC control lead is set to "1" after the power-on the machine.

Figure 12:
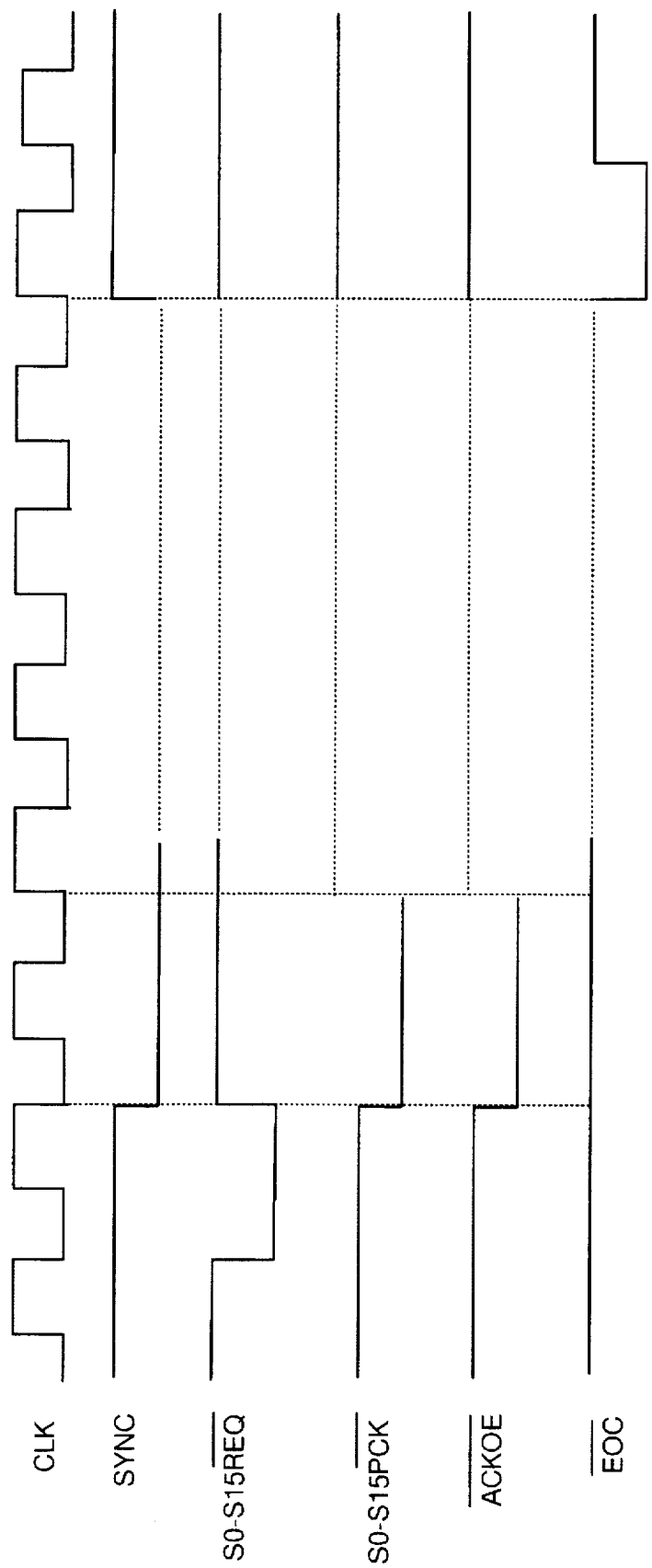
FIG. 12 are illustrative timing diagrams of the control signals.

Illustrative timing diagrams of the above mentioned control signals can be shown in the FIG. 12.

Figure 13:
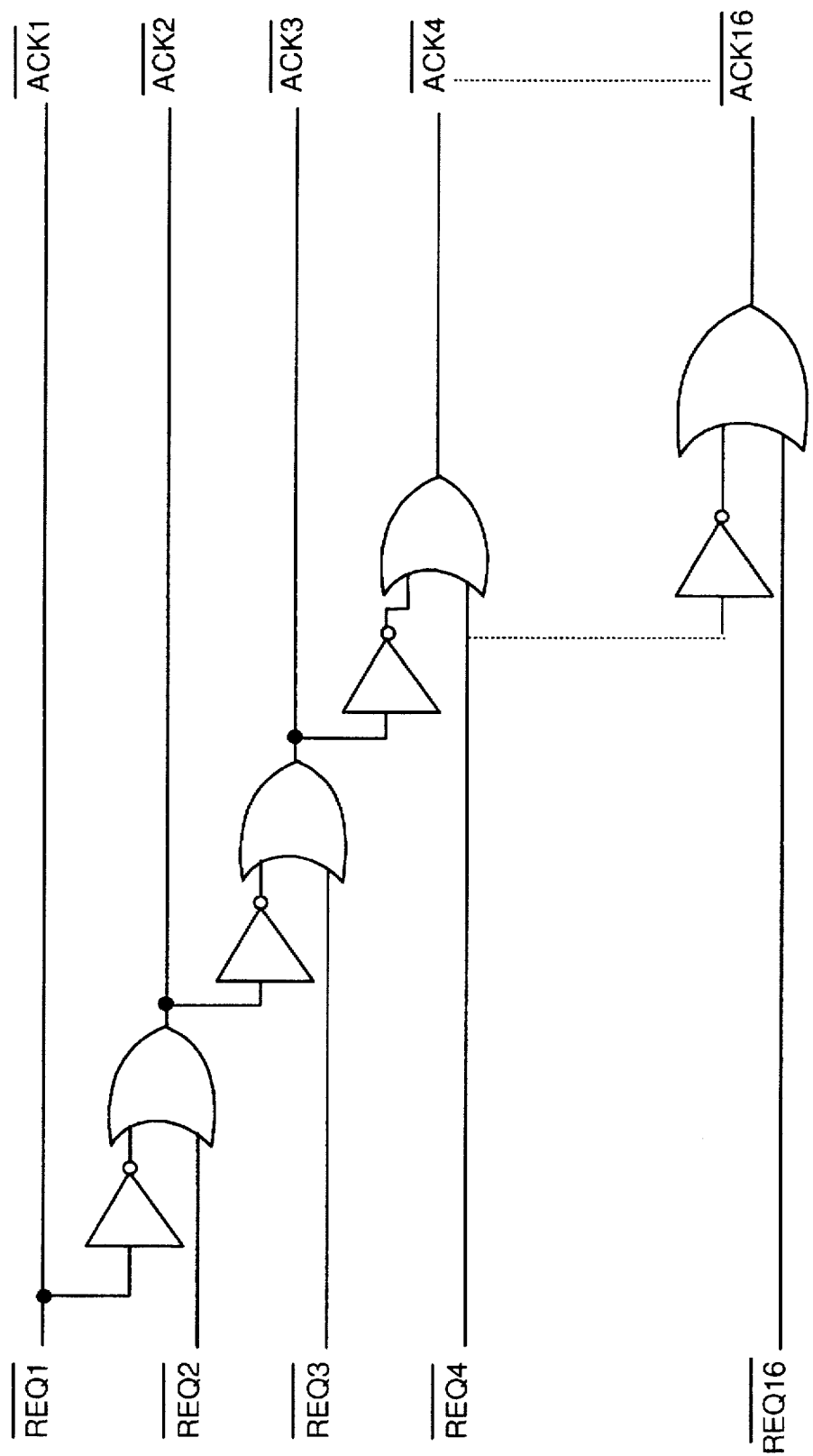
FIG. 13 illustrates the internal structure of arbiter 700.

Then, arbiter 700 processes the REQUEST word and generates an ACK WORD on bus 701 corresponding to the REQUEST word that is existing on bus 610. For this purpose, arbiter 700 contains a set of combinatory logic which permits to derive one ACK 16-bit word corresponding to the REQUEST word existing on bus 610. It should be noticed that if two adapters are requesting the bus at the same time, the REQUEST word on bus 610 will have two logical zero at the same time. This contention will be managed by arbiter 700 which will provide a ACK 16-bit word on bus 701 where one of the two adapters will be get the higher priority. The structure of such arbiter mechanism is well known to the skilled man and will consequently not be detailed further. FIG. 13 shows a preffered embodiment of the arbiter 700.

The ACK acknowledge word generated by arbiter 700 is then transmitted to S0–S15 bus 610 by means of buffer 720. This is achieved by the activation of the OE output_Enable input lead of buffer 720, generated by control_3 state machine 730, causing the ACK word to be transmitted to bus 610. This is done after the reset of the 16-bit latch 710 resulting from the activation of its Set Input lead connected to a CLEAR output lead of control_3 state machine 730. Control_3 state machine 730 has an S0_S15_ACK input lead which receives the output of a 16-bit AND gate 910. AND gate 910 has each input connected to one among the 16 bits of the ACK words generated by arbiter 700.

Figure 14:
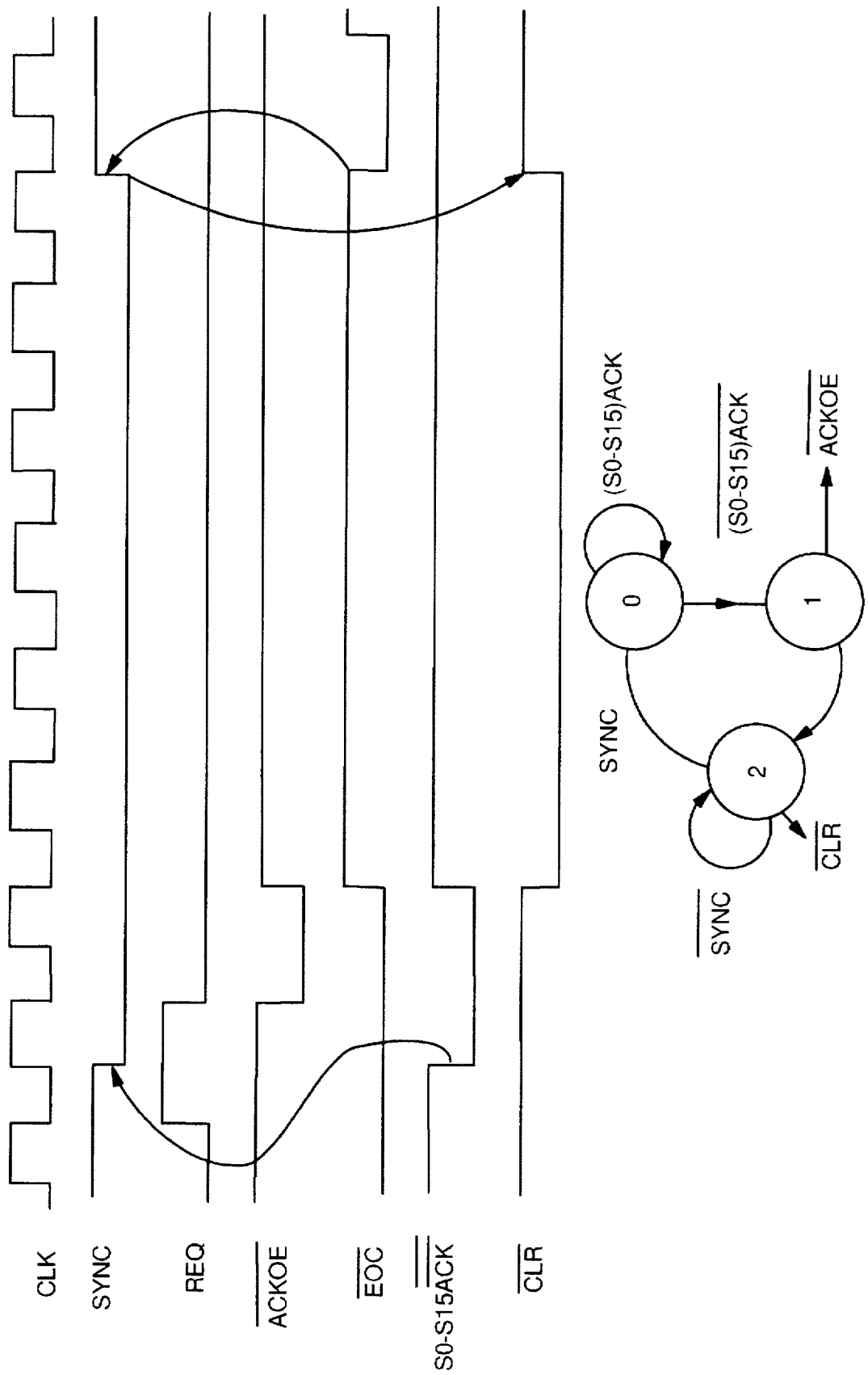
FIG. 14 illustrates the control_3 state machine and representative timing diagrams.

Additionaly, the output of AND gate 910 is connected to the reset input lead of latch 940. This results in the SYNC control lead (which is connected to the Q outpout lead of latch 940) been fixed to a low voltage, what locks the NAND gates 450 which are located in the different adapters. This mechanism therefore prevents any additional request to be presented to the system bus. FIG. 14 illustrates the working of the control_3 state machine and representative timing diagrams.

The ACK word which is generated by arbiter 700 is transmitted to the 16-input leads of multiplexor 460. Control_1 state machine 540 (shown in FIG. 6) generates a ACKEN Acknowledge Enable signal which is transmitted to the STROBE (STB) input lead of multiplexer 460. Therefore, multiplexer 460 performs a 16-to-4 encoding process on the 16-bit ACK word, and the result is transmitted to a first input bus I0–I3 of comparator 430 (in FIG. 3). The latter comparator has a second input bus which receives the SID0–3 word existing on the system bus.

In the case where the two input bus of comparator 430 carry the same value, indicative of the fact that this adapter has been granted the bus by arbiter 700, then inverted EQ output is set to a low level. This results in the setting of the latch 420, and correspondly the switching of the inverted Q output to a low level. This causes latch 410 to be reset, and AND gate 450 to be inhibited. The Q output lead 421 of latch 420 is also transmitted to one input lead of CONTROL_1 state machine 540.

Once the bus has been granted to the considered adapter, Adapter A in our example, the transmission of data from the XMIT FIFO 310 of adapter A starts to the RCV FIFO 330 located in adapter B. For this purpose, CONTROL_1 state machine 540, receiving the low level of the SYNC signal 630 and the clock signal 640, generates, in addition to the ACKEN signal, a LOADEN LOAD_Enable signal which is transmitted to the set input of a latch 470. The output of the latter then generates a high level which is transmitted to a first input of an AND gate 490, having a second input the clock signal via an inverter 800, and an output which is connected to the SHIFT OUT input lead of XMIT FIFO 310. Parallely, the inverted Q output of latch 470, carrying a low level, opens the buffer 320 by activating its Output_Enable control lead. This causes the consecutive transmission of the data block which is stored into XMIT_FIFO circuit 310, at the rythm of the clock signal received at its SHIFT_OUT control lead, on bus 610 of system bus 600.

Figure 8:
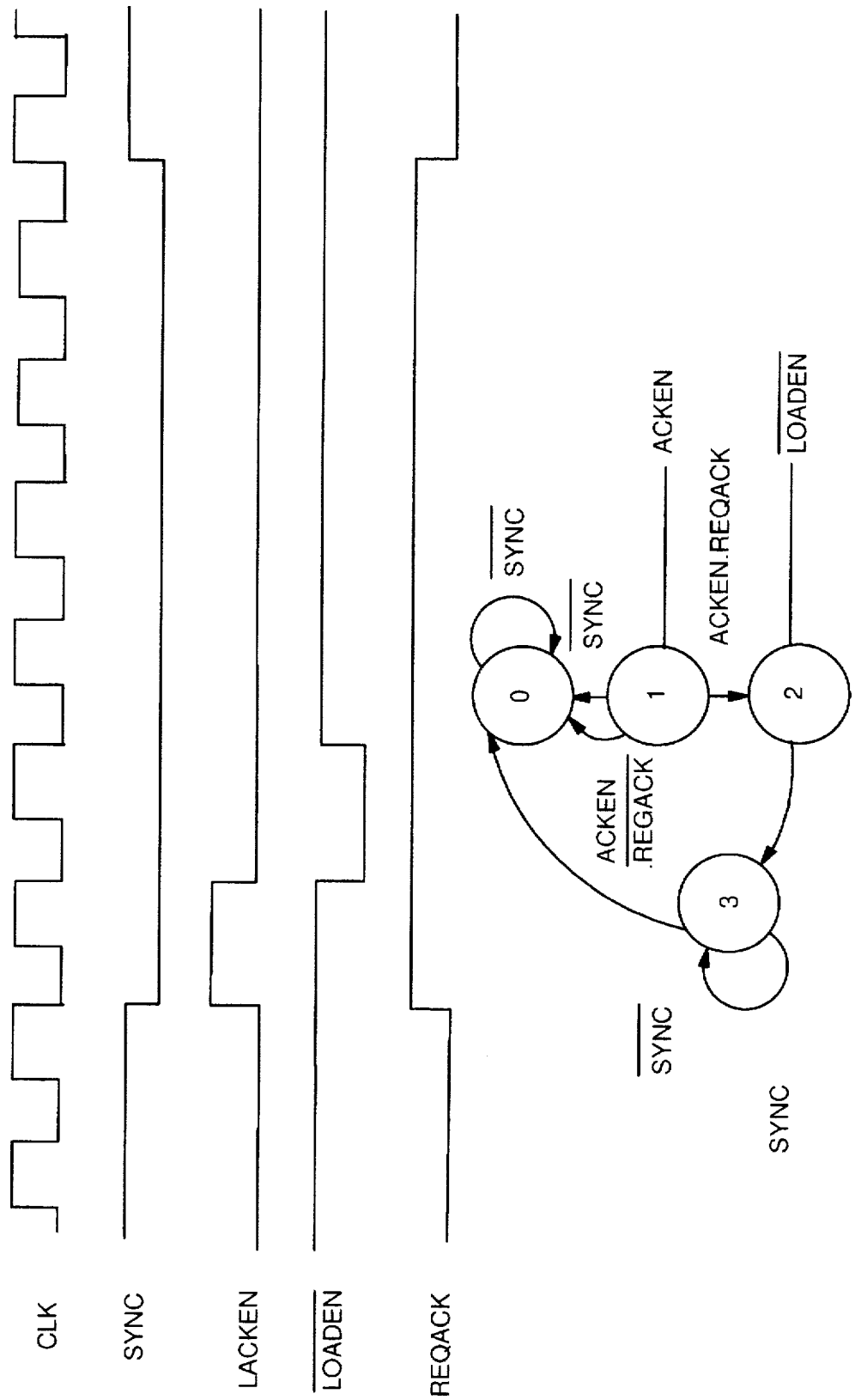
FIG. 8 shows illustrative timing diagrams and a flow chart of the operating of the Control_1 state machine 540.

Illustrative timing diagrams and the operating of the Control_1 state machine 540 are shown in FIG. 8.

FIG. 9 shows representative signals used during the transmission of the data block by XMIT_FIFO circuit 310.

The data which is sequentially transmitted by the XMIT_ FIFO circuit 310 of adapter A is processed by the internal circuitry of adapter B as follows.

Register 390 located in adapter B monitors the contents of D3–D6 which is extracted from bus 610. As mentioned above, this contents carries the address of the destination adapter, that is adapter B in our example.

Figure 10:
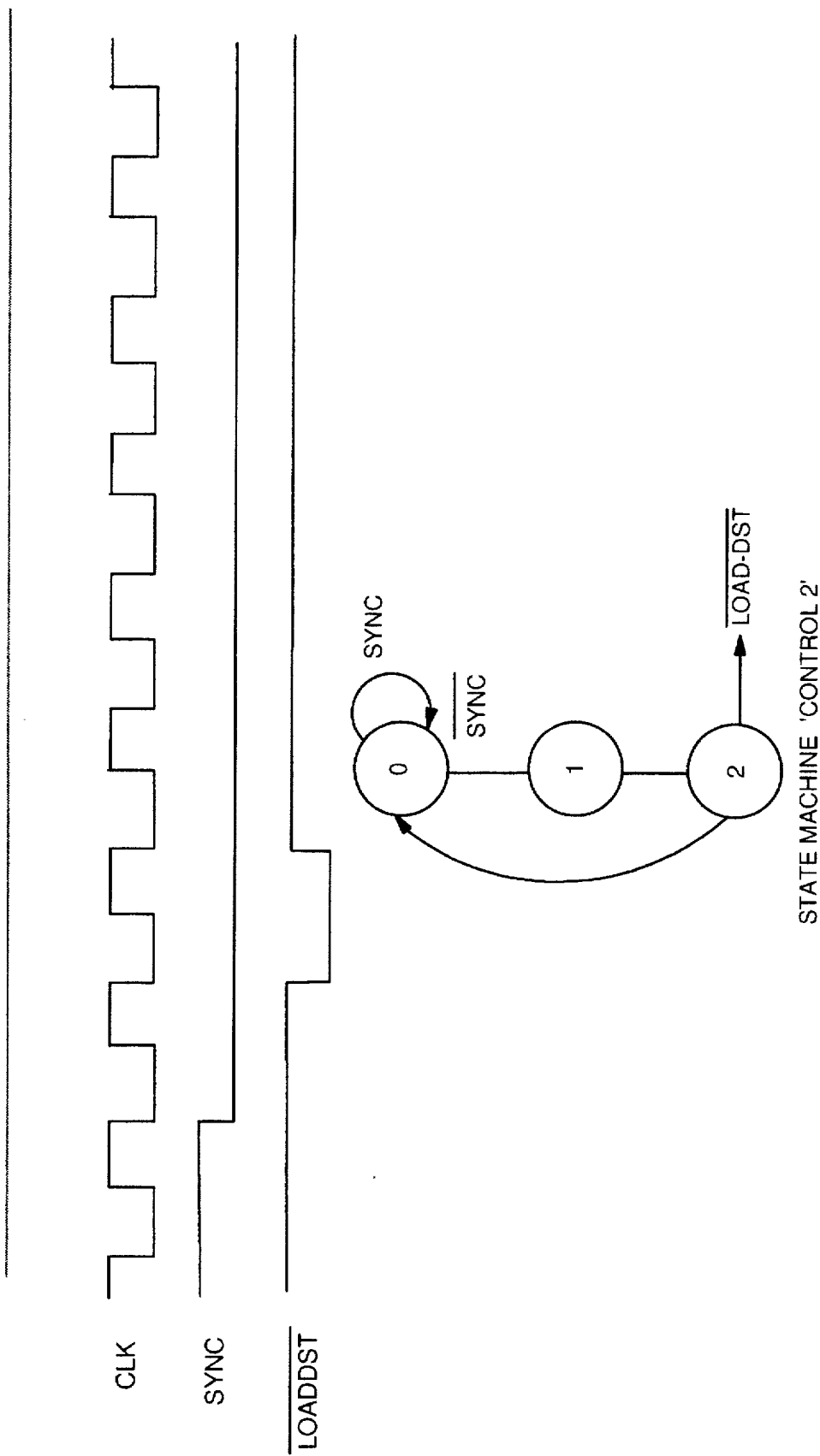
FIG. 10 illustrates the timing diagrams of inverted LOADDST (LOAD_DESTINATION) control signals generated in the receive part of adapter B.

CONTROL_2 state machine 900 in adapter B generates the inverted LOADDST (LOAD _DESTINATION) control signals as illustrated in the timing diagrams of FIG. 10. For this purpose, CONTROL_2 state machine receives the two SYNC and CLK signals 630 and 640. The output of that state machine is then transmitted to the LOAD input lead of register 390, what results in the latching of the destination address in the register. Comparator 380 receiving the contents of register 390 at its first input, as well as the SID0-3 slot identification at its second input, generates a low level at its EQ output lead when the two values match together. The low level generated at the output of comparator 380 is used to set a latch 370. The latter has its true output connected to a first input lead of an AND gate 340, having a second input receiving the clock signal through an inverter 810. Therefore, the output of AND gate 340 generates the SHIFT_IN clock signal which permits the sequential loading of the data block available on the bus 610.

Consequently, the RCY_FIFO 330 located in the adapter having its SID slot identification corresponding to the destination address requested by adapter A, i.e. adapter B in our example, is sequentialy loaded with the data block extracted from the RAM storage of adapter A.

Figure 11:
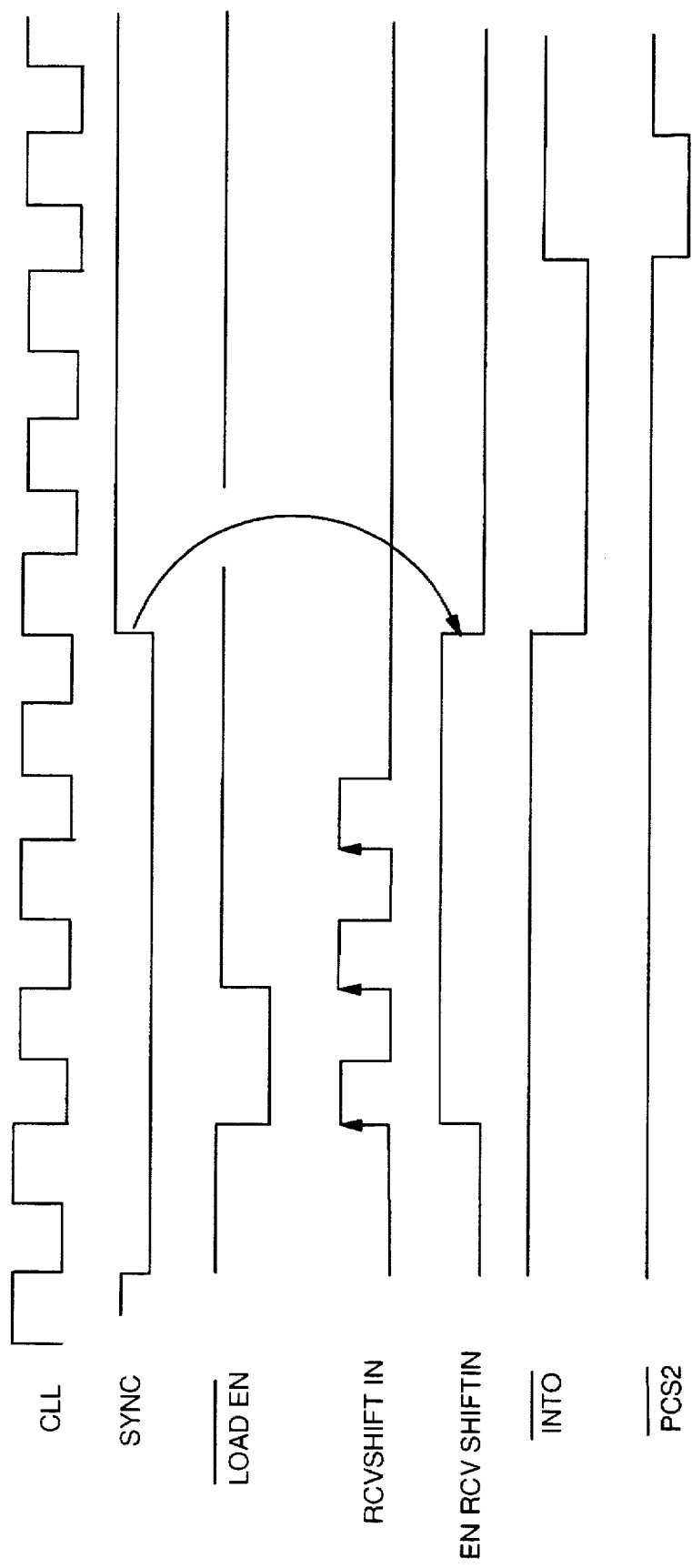
FIG. 11 shows Illustrative timing diagrams which are involved in this loading process of the RCE_FIFO circuit 330 of adapter B.

Illustrative timing diagrams which are involved in this loading process are shown in FIG. 11.

With respect to the XMIT part of adapter A again, there will now be described how the transmission of the data block will be completed. This requires the use of register 530, counter 520 and comparator 500.

More accurately, the input of register 530 receives the S7-S11 control leads on the bus (forming sub bus 612) which carry the data block size which is to be transmitted. This value is loaded into register 530 on the occurence of the LOAD_EN signal transmitted to the LOAD input lead of the latter, and also to the RESET input lead of counter 520.

The outpout of register 530 is connected to one 5-bit input bus of comparator 500, having a second 5-bit input bus receiving the contents of counter 520. The clock input lead of counter 520 receives the output of a AND gate 510, one input of which receiving the clock signal. AND gate 510 has a second input which is connected to the true Q output lead 471 of latch 470. Since this Q output lead carries a high level, the clock input lead of counter receives the system clock 640, what results in its incrementation.

As soon as the two input bus of comparator 500 are equal, the latter has its output which switches to a low level, what results in the latch 470 being resetted. Control signal 471 is then put to a low level, what disables the AND gate 490 and 510. This results in the completion of the XMIT_FIFO deloading process.

A negative pulse is also transmitted to the input lead 471 of AND 510, which is transmitted to one input lead of an open-collector AND gate 550 via a inverter 560. Parallely, the negative pulse is also transmitted to the D input lead of latch 570, having its clock input lead receiving the system clock. The output of latch 570 is transmitted to a second input lead of AND gate 550. The combination of latch 570, inverter 560 and the AND gate 550, provides the generation at the output of gate 550 of an unique END_OF_CYCLE pulse of one period of the system clock. That pulse is generated at the output of open-collecter AND gate 550 which is connected to lead 650 of bus 600. The END_OF_CYCLE signal is transmitted to the back plane card and particularly to a second input lead of AND gate 930, which output is connected to the set input lead of latch 940, as mentioned above. Therefore, on the occurence of the latter END_OF_CYCLE pulse, latch 940 is resetted and its Q output lead, consisting in the SYNC control signal, switches to a high level. The positive transition of the SYNC control signal is then transmitted to the reset input lead of latch 370 through inverter 350, both located within adapter B which has received the transmitted data block. As a result of the reset of latch 370, its inverted Q output lead transmits a positive pulse to the clock input lead of latch 360 having its D input lead receiving the positive voltage Vcc. Therefore, the inverted Q output lead of the latter latch switches down, what is used as an interrupt signal for processor 100 on lead 114. Consequently, the processor 100 of adapter B is made aware a whole data block is available in the RCV_FIFO circuit 330. From this instant, processor 100 can perform the transferring of this data block into its RAM storage 250. This is achieved, as above, by means of the activation of MCS2 control signal 107 which is transmitted to the SHIFT_OUT input lead of RCV_FIFO circuit 330. The data block is then sequentially loaded into the RAM storage through address/data bus 101, by means of the appropriate ALE control signal 102, WRITE control signal 104 and MCSO chip select control signal 105. Once the whole data block has been stored into RAM storage 250, processor 100 resets latch 360 by means of PCS2 control signal 111.

On the switching of latch 370, its Q output lead is set to a low level, that prevent AND gate 340 from transmitting the clock signal to the SHIFT_IN input lead of RCV_FIFO circuit 330. Therefore, the latter FIFO stops loading data.

With respect to the adapter A again, on the switching up of the SYNC control signal, the output of inverter 400 transmits a low level to the reset input lead of latch 420. Therefore, its Q output lead generates a high level, which is used as a control signal for the CONTROL_1 state machine 540. Also, the inverted Q output lead, which was continuously resetting latch 410, switches up, what allows the processor 100 of adapter A to reissue a further request, if necessary.

Therefore, it appears that the adapter A has transmitted a full data block into the adapter B, with the data block beginning by a signalling word. In the preferred embodiment of the invention, the transfer of a data block from adapter A to adapter B is made by means of a SIGNALLING word having its three command bits set to zero.

Therefore, the processor 100 of adapter B is made aware of the fact a data block has been transferred into its RCV_FIFO 330. As mentioned above, the SIGNALLING WORD include bits D7–D11 characterizing the size of the data block which is transferred and bits D12–D15 characterizing the address of the source adapter.

Therefore, the processor 100 of adapter B can also know the size of the data block which was automatically loaded into the RCV_FIFO circuit 330, and which is to be transmitted into the RAM storage 250.

This is a substantial advantage since the loading of RCV_FIFO circuit 330 does not require any particular operations performed by the processor. This is particularly advantageous for high speed transmissions which are involved in multimedia applications.

Now that the processor 100 of adapter B has transferred the contents of the RCV-FIFO 330 into its associated RAM storage 250, the processor further transmits an acknowledgment of the reception to the adapter A. This is achieved in the preferred embodiment of the invention by the transmission from adapter B to adapter A of an additional data block that comprises an unique ACKNOWLEDGE signalling word having its commands bits set to "001". It should be noticed that the additional commands are available for more sophisticated applications. For instance, one additional command (based on the commands bits being equal to "010") could be the request from adapter A of a read operation of the RAM storage located into adapter B.

Therefore, it appears that numerous specific block transmission operations, having a variable size, can be permitted between the different adapters plugged in the back plane card.

We claim:

1. An adapter for transmitting or receiving data in multimedia applications, wherein said data is of variable size, said adapter comprising:

means for reading a slot identification identifying a physical locations of a slot in which said adapter is plugged;

means for generating a request to be transmitted via a system bus to a central backplane card for requesting an access to said system bus, wherein said request has one unique zero, wherein the location of said one unique zero in said request indicates said slot identification of said adapter;

means for detecting an acknowledgement generated by said central backplane card, wherein said acknowledgement indicates said access to said system bus has been granted to said adapter;

means for generating a data block, being sized to support a multimedia application for which the adapter is being used, comprising a signalling word and reminder data words, said signalling word to be transmitted as a first word of the data block to an adapter designated to receive the data block and comprising a command from said adapter to said adapter designated to receive the data block, an address of said adapter designated to receive data, a size of said data and an address of said adapter; and means for successively transmitting said remainder data words in parallel via said system bus after said signalling word has been received and processed by said adapter designated to receive date, wherein said adapter and said adapter designated to receive the data block are both located within a single computer system.

2. The adapter for transmitting or receiving data of claim 1, wherein said adapter further comprising:

a processor, coupled with a RAM storage and a ROM storage, for computing said request from said slot identification of said adapter;

a first register for storing said request computed by said processor;

means for detecting a first control signal generating by said central backplane card, wherein said first control signal indicates an availability of said system bus; and means responsive to said first control signal for causing said first register to generate said request to said system bus.

3. The adapter for transmitting or receiving data of claim 2, wherein said adapter further comprising:

a first buffering means for storing blocks of said data which are to be extracted from said RAM storage and to be transmitted to said adapter designated to receive data;

a detecting means having a multiplexor to receive said acknowledgement for performing an encoding process;

a first comparator having a first input and a second input, wherein said first input of said first comparator is for receiving any output from said multiplexor, and said second input of said first comparator is connected to said system bus for receiving said slot identification;

means for receiving an output signal from said first comparator for generating a second control signal indicating said access to said system bus has been granted to said adapter; and means responsive to said second control signal for causing said successive transmission of said blocks of said data stored in said first buffering means.

4. The adapter for transmitting or receiving data of claim 3, wherein said adapter further comprising:

a second register for storing a size of said blocks of said data to be transmitted to said adapter designated to receive data;

a counter driven by a system clock from said system bus;

a second comparator having a first input connected to an output of said second register, and a second input connected to an output of said counter;

means for receiving an output signal from said second comparator for blocking said transmission of said block of data at the occurrence of an equality between said counter and said second comparator, whereby said first buffering means stops producing said blocks of said data on said system bus.

5. The adapter for transmitting or receiving data of claim 4, wherein said adapter further comprising:

means for monitoring said data header transmitted via said system bus;

means for processing said data header further includes means for decoding the address of said adapter designated to receive data in order to determine whether said blocks of said data transmitting through said system bus is to be received by said adapter designated to receive data; and means for extracting said size value of said blocks of data in said data header in order to determine the size of the storage location intended for storing said blocks of data.

6. The adapter for transmitting or receiving data of claim 5, wherein said adapter further comprising:

a second buffering means for sequentially loading said blocks of said data from said system bus;

a third register for storing said address of said adapter designated to receive data extracted from said data header, and associating said address of said adapter designated to receive data with a particular block of said blocks of said data transmitted from said adapter;

a third comparator for receiving at its first input said address and for receiving at its second input said slot identification which are extracted from said system bus;

means for receiving an output of said third comparator for generating a third control signal to allow successive loading of said blocks of data which are available on said system bus, into said second buffering means; and means for decoding said third control signal indicative of the completion of transmitting of said blocks of said data.

7. A telecommunication equipment comprises the adapter of claim 2.

8. The adapter of claim 1 wherein the command includes three command bits.

9. The adapter of claim 8 wherein the three command bits are being set to zeros.

10. A transmission system for handling multimedia (composite) information including data, voice, video and audio (voice) comprising:

a high speed bus for transmitting the multimedia information;

a plurality of adapters coupled to the high speed bus; and a back plane adapter coupled to the high speed bus; said back plane adapter receiving signals from the plurality of adapters requesting use of the bus and issuing signals indicating permission to use the bus to a selected one of the plurality of adapters wherein at least one of the plurality of adapters includes means for generating a data block comprising of a signalling word and reminder data words, said signalling word, to be transmitted as a first word of the data block to an adapter designated to receive the data block, comprising a command from said adapter to said adapter designated to receive the data block, an address of said adapter designated to receive data, a size of said data and an address of said adapter; and means for successively transmitting said remainder data words in parallel via said system bus after said signalling word has been received and processed by said adapter designated to receive data, wherein said adapter and said adapter designated to receive the data block are both located within said transmission system.

11. An adapter for transmitting data to or receiving data from a second adapter installed within a computer in which said adapter is located, wherein said data is of variable size, said adapter comprising:

means for reading a slot identification identifying a physical location of a slot in which said adapter is plugged;

means for generating a request to be transmitted via a system bus to a central backplane card for requesting an access to said system bus, wherein said system bus is controlled by said central backplane card, wherein said request includes one unique zero, wherein the location of said one unique zero in said request indicates said slot identification of said adapter;

means for detecting an acknowledgement signal generated by said central backplane card, wherein said acknowledgement signal indicates said access to said system bus has been granted to said adapter;

means for generating a data header to be transmitted to said second adapter designated to receive data, wherein said data header includes a command from said adapter to said central backplane card, an address of said second adapter, a size of said data and an address of said adapter;

means for successively transmitting said data in parallel via said system bus after said data header is being received and processed by said second adapter;

means for successively receiving said data in parallel via said system bus after said data header is being received and processed by said second adapter;

means for transmitting a reception acknowledgement signal; and means for receiving said reception acknowledgement signal.

12. A method for exchanging data between two adapters installed within a computer, wherein said computer includes at least said two adapters and a central backplane card attaching to a system bus, said method comprising the steps of:

reading a slot identification to identify a physical location of a first slot in which a first adapter is plugged within said computer;

generating a request to be transmitted via said system bus to said central backplane card for requesting an access to said system bus, wherein said system bus is controlled by said central backplane card, wherein said request includes one unique zero, wherein the location of said one unique zero in said request indicates said slot identification of said adapter;

detecting an acknowledgement signal from said central backplane card by said first adapter, wherein said acknowledgement signal indicates said access to said system bus has been granted to said first adapter;

generating a data header to be transmitted to a second adapter designated to receive data, wherein said data header includes a command from said first adapter to said central backplane card, an address of said second adapter, a size of said data, and an address of said first adapter;

successively transmitting said data in parallel via said system bus after said data header is being received and processed by said second adapter; and transmitting a reception acknowledgement signal from said second adapter to said first adapter.

* * * * *